(No Model.)

F. CLOUTH.
INSULATED ELECTRIC CONDUCTOR.

No. 546,579. Patented Sept. 17, 1895.

Witnesses
H. van Oldenneel
E. F. Scott

Inventor
Franz Clouth
by Richardson
Attorneys

UNITED STATES PATENT OFFICE.

FRANZ CLOUTH, OF COLOGNE, GERMANY.

INSULATED ELECTRIC CONDUCTOR.

SPECIFICATION forming part of Letters Patent No. 546,579, dated September 17, 1895.

Application filed June 26, 1895. Serial No. 554,096. (No model.) Patented in England December 14, 1894, No. 24,374.

*To all whom it may concern:*

Be it known that I, FRANZ CLOUTH, a citizen of the German Empire, and a resident of Cologne, Nippes, Germany, have invented certain new and useful Improvements in Insulated Electric Conductors, of which the following is a specification.

The invention has been patented in Great Britain December 14, 1894, No. 24,374.

In electric wires as at present used, which are insulated by means of caoutchouc, such insulation of the conducting-wire, especially for currents of high tension, is to the least possible degree affected by the heating of the wire by the current, but it has this disadvantage, that caoutchouc does not possess the important quality of being absolutely resistent, so that caoutchouc is inapplicable—for instance, for submarine cables with currents of high tension. Recourse has heretofore been taken to gutta-percha, which latter material, though offering an excellent protection against humidity, does not so well withstand the heat produced by the electric current as caoutchouc. To do away with the defect—that is to say, to produce a reliable submarine cable or cable in general which is fitted for safely conducting high-tensioned current and offers the least protection against humidity—is the object of the invention. Such cable is shown in the annexed drawings, in which—

Figure 1:
Figure 2:
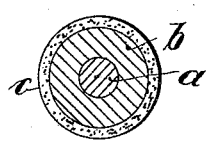

Figure 1 is an elevation, and Fig. 2 a cross-section thereof.

Around a wire $a$ is placed as the first insulating-matter a caoutchouc layer $b$, and this latter is again insulated outwardly by a coating of gutta-percha $c$. In this new arrangement the caoutchouc permits of greater tension of the electric current in spite of the heat produced in the wire, and on the other hand, owing to the outer layer of gutta-percha covering, and thus protecting the caoutchouc from coming in contact with any outward humidity, perfect insulation of the wire is obtained.

I claim—

The combination with an electrical conducting wire or conductor, of a covering layer of caoutchouc surrounding said conductor or wire and a layer of guttapercha surrounding and inclosing the caoutchouc, substantially as described for the purpose set forth.

In testimony that I claim the foregoing as my invention I have signed my name in presence of two subscribing witnesses.

FRANZ CLOUTH.

Witnesses:
   FRITZ SCHRÖDER,
   WILLIAM H. MADDEN.